(12) United States Patent
Taketomi (10) Patent No.: US 10,087,943 B2
(45) Date of Patent: Oct. 2, 2018

(54) FLOW VOLUME MEASUREMENT DEVICE FOR TURBO COMPRESSOR, AND TURBO COMPRESSOR

(71) Applicant: IHI Rotating Machinery Engineering Co., Ltd., Tokyo (JP)

(72) Inventor: Toshimichi Taketomi, Tokyo (JP)

(73) Assignee: IHI Rotating Machinery Engineering Co., Ltd., Tokyo (JP)

( * ) Notice: Subject to any disclaimer, the term of this patent is extended or adjusted under 35 U.S.C. 154(b) by 277 days.

(21) Appl. No.: 14/939,201

(22) Filed: Nov. 12, 2015

(65) Prior Publication Data

US 2016/0061206 A1 Mar. 3, 2016

Related U.S. Application Data

(63) Continuation of application No. PCT/JP2014/067822, filed on Jul. 3, 2014.

(30) Foreign Application Priority Data

Jul. 5, 2013 (JP) ................................. 2013-142047

(51) Int. Cl.
 *F04D 27/00* (2006.01)
 *F04D 17/12* (2006.01)
 (Continued)

(52) U.S. Cl.
 CPC ........... *F04D 27/001* (2013.01); *F04D 17/10* (2013.01); *F04D 17/12* (2013.01); *F04D 25/06* (2013.01);
 (Continued)

(58) Field of Classification Search
 CPC ........ F04D 27/001; F04D 17/10; F04D 17/12; F04D 25/06; F04D 25/163; F04D 29/284;
 (Continued)

(56) References Cited

U.S. PATENT DOCUMENTS 4,363,596 A * 12/1982 Watson ................ F01D 17/143
 415/1
5,076,765 A * 12/1991 Yagi ...................... F01D 25/183
 277/366

(Continued)

FOREIGN PATENT DOCUMENTS

CN 101666325 A 3/2010
CN 102944267 A 2/2013
 (Continued)

OTHER PUBLICATIONS

International Search Report, PCT/JP2014/067822, dated Sep. 22, 2014, 1 pg.
 (Continued)

*Primary Examiner* — Woody Lee, Jr.
(74) *Attorney, Agent, or Firm* — Volpe and Koenig, P.C.

(57) ABSTRACT

A flow volume measurement device for a turbo compressor includes a first pressure guide tube communicating with an intake pipe connected to a second compression stage having a compressor impeller that compresses a gas; and a second pressure guide tube communicating with an intake port of the second compression stage, which has a smaller internal diameter than an internal diameter of the intake pipe, and measures the flow volume of the gas on the basis of a difference in pressure between the first pressure guide tube and the second pressure guide tube.

20 Claims, 7 Drawing Sheets

(51) Int. Cl.
*F04D 29/42* (2006.01)
*F04D 17/10* (2006.01)
*F04D 25/06* (2006.01)
*F04D 29/28* (2006.01)
*F04D 25/16* (2006.01)
*G01F 1/40* (2006.01)

(52) U.S. Cl.
CPC ......... *F04D 25/163* (2013.01); *F04D 29/284* (2013.01); *F04D 29/4206* (2013.01); *F04D 29/4213* (2013.01); *F05D 2270/3011* (2013.01); *F05D 2270/3015* (2013.01); *G01F 1/40* (2013.01)

(58) Field of Classification Search
CPC ............. F04D 29/4206; F04D 29/4213; F05D 2270/3011; F05D 2270/3015; G01F 1/40
See application file for complete search history.

(56) References Cited

U.S. PATENT DOCUMENTS

| | | | |
|---|---|---|---|
| 2003/0168064 A1 | 9/2003 | Daly et al. | |
| 2003/0235492 A1* | 12/2003 | Mirsky | F04D 15/0022 415/1 |
| 2005/0103339 A1 | 5/2005 | Daly et al. | |
| 2005/0217673 A1 | 10/2005 | Daly et al. | |
| 2007/0134085 A1 | 6/2007 | Daly et al. | |
| 2012/0266887 A1 | 10/2012 | Daly et al. | |
| 2014/0041663 A1 | 2/2014 | Daly et al. | |
| 2015/0192147 A1* | 7/2015 | An | F04D 29/4213 415/58.4 |
| 2016/0333885 A1 | 11/2016 | Daly et al. | |
| 2016/0339193 A1 | 11/2016 | Daly et al. | |

FOREIGN PATENT DOCUMENTS

| | | | |
|---|---|---|---|
| DE | 102004038523 A1 * | 3/2006 | ............. F01D 17/08 |
| EP | 1318307 A1 | 6/2003 | |
| JP | 50-009109 A | 1/1975 | |
| JP | 56-143380 A | 11/1981 | |
| JP | 63-094098 A | 4/1988 | |
| JP | 05-099199 A | 4/1993 | |
| JP | 05-223099 A | 8/1993 | |
| JP | 08121381 A * | 5/1996 | ........... F04D 27/001 |
| JP | 09-280913 A | 10/1997 | |
| JP | 2001-304926 A | 10/2001 | |
| JP | 2002-188944 A | 7/2002 | |
| JP | 2003-214395 A | 7/2003 | |
| JP | 2004-197611 A | 7/2004 | |
| JP | 2006-527324 A | 11/2006 | |
| JP | 2009-068431 A | 4/2009 | |
| JP | 2010-236401 A | 10/2010 | |
| JP | 4617660 B2 | 11/2010 | |
| JP | 2013-079586 A | 5/2013 | |

OTHER PUBLICATIONS

Japanese Office Action with English translation, Japanese Patent Application No. 2015-525277, dated Nov. 22, 2016, 10 pgs.

* cited by examiner

FLOW VOLUME MEASUREMENT DEVICE FOR TURBO COMPRESSOR, AND TURBO COMPRESSOR

This application is a Continuation of International Application No. PCT/JP2014/067822, filed on Jul. 3, 2014, claiming priority based on Japanese Patent Application No. 2013-142047, filed on Jul. 5, 2013, the contents of both International Application and the Japanese Application are incorporated herein by reference in their entirety.

TECHNICAL FIELD

Embodiments described herein relates to a flow volume measurement device for a turbo compressor, and a turbo compressor.

BACKGROUND

In the related art, devices in which an orifice plate is provided within the pipe and the flow volume of a gas is measured by measuring a difference in pressure in front of and behind the orifice plate is known as devices that measure the flow volume of a gas flowing through the inside of a pipe. Japanese Unexamined Patent Application, First Publication No. 63-94098 (Patent Document 1) discloses a turbo compressor including a surging detecting device for measuring the flow volume of a gas and performing an operation of avoiding the occurrence of surging accompanying a reduction in flow volume.

In this surging detecting device, an orifice for flow volume measurement is attached to a suction-side pipe of the turbo compressor, a difference in pressure in front of and behind the orifice is oscillated by a pressure difference oscillator, an output signal is received by a receiver, surging is determined to have occurred, for example, if the pressure difference has a fluctuation of 10% or more as compared to a signal one second before, and a suitable surging preventing device is actuated (refer to FIG. 1 of Patent Document 1).

Japanese Unexamined Patent Application, First Publication No. 2010-236401 (Patent Document 2) discloses well-known members constituting a turbo compressor, such as an intake pipe that supplies a gas taken into a compressor impeller, and an inlet guide vane that adjusts the flow volume of the gas taken into the compressor impeller (refer to Abstract, Paragraph [0017], and FIG. 1 of Patent Document 2).

Japanese Unexamined Patent Application, First Publication No. 2002-188944 (Patent Document 3) discloses a flow measurement device in which two conduits having different internal diameters from an upstream side of the conduits to a downstream side thereof are connected to each other, an upstream pressure hole 26 and a downstream pressure hole 27 where the pressures of a gas that flows through the conduits are measured are provided on the upstream side where the internal diameter of the conduits is larger and on the downstream side where the internal diameter of the conduits are smaller, and the flow volume of the gas is measured from the difference between the pressure of the gas measured by the upstream pressure hole 26 and the pressure of the gas measured by the downstream pressure hole 27 (refer to Paragraphs [0022] and [0034] and FIG. 2 of Patent Document 3).

Japanese Unexamined Patent Application, First Publication No. 2004-197611 (Patent Document 4) discloses a well-known member constituting a turbo compressor, such as a diffuser passage 14 provided around a compressor impeller, and a scroll passage 13 provided further outside the diffuser passage 14 (refer to Paragraph [0017] and FIG. 1 of Patent Document 4).

SUMMARY

Technical Problem

Since an air passage with different diameters in the same place is required in order to measure pressure difference, generally, a straight pipe welding structure, having a certain degree of length, in which the orifice plate is provided is connected to the intake pipe of the turbo compressor, as described in Patent Document 1.

However, the orifice plate itself is expensive, and high measurement precision may not be required depending on the type of flow volume control. Moreover, a place where the straight pipe welding structure can be connected is limited to the intake pipe (inlet) or a discharge pipe (outlet) where an installation space can be secured. For example, when the turbo compressor is a multistage compressor, the installation is difficult between compression stages in which a pipe is bent and disposed.

The problem of this installation space is also the same in a venturi type flowmeter using a Venturi tube that is another device that measures the flow volume of a gas.

The disclosure is made in view of the above circumstances, and an object thereof is to provide a flow volume measurement device for a turbo compressor that can be simply and inexpensively installed.

Solution to Problem

According to a first aspect of the disclosure, there is provided a flow volume measurement device for a turbo compressor, including a first pressure guide tube communicating with an intake pipe connected to a compression stage having a compressor impeller that compresses a gas; and a second pressure guide tube communicating with an intake port of the compression stage, which has a smaller internal diameter than an internal diameter of the intake pipe, in which the flow volume measurement device measures the flow volume of the gas on the basis of a difference in pressure between the first pressure guide tube and the second pressure guide tube.

In the first aspect of the disclosure, the flow volume of the gas is measured from the difference in pressure between the intake pipe connected to the compression stage and the intake port formed in the compression stage. In order to make the flow of the gas introduced into the compressor impeller uniform, the intake port formed in the compression stage has a smaller internal diameter than an internal diameter of the intake pipe, and plays a role of a Venturi tube in flow volume measurement. For this reason, in the first aspect of the disclosure, the flow volume measurement can be performed using the structure of the turbo compressor without separately preparing an orifice plate or a Venturi tube, and the flow volume measurement device can be simply and inexpensively installed.

In a second aspect of the disclosure based on the first aspect, the compression stage includes an inlet part in which the inlet part is formed and in which a spiral groove is formed in an outer peripheral surface of the inlet part, and a casing that has a recess into which the inlet part is fitted and forms a scroll passage in cooperation with the spiral groove, and at least a portion of the second pressure guide tube is formed in the inlet part.

In a third aspect of the disclosure based on the second aspect, at least a portion of the second pressure guide tube is formed by a first hole that is formed in a radial direction while avoiding the spiral groove in the inlet part and communicates with the intake port, and a second hole that is formed in an axial direction in the inlet part and communicates with the first hole.

In a fourth aspect of the disclosure based on the third aspect, the first hole is formed outside an axial region of the inlet part where the spiral groove is formed.

In a fifth aspect of the disclosure based on the fourth aspect, the inlet part includes a lightening groove that is arranged around the intake port and is formed with a depth depending on an axial depth of the spiral groove, and a rib formed so as to cross the lightening groove in the radial direction, and the first hole is formed at a position corresponding to the rib.

In a sixth aspect of the disclosure based on any one of the third to fifth aspects, a plurality of the first holes are formed at predetermined intervals in a circumferential direction in the inlet part.

In a seventh aspect of the disclosure based on the sixth aspect, a terminating portion of the spiral groove is arranged between the first holes adjacent to each other in the circumferential direction in the inlet part.

According to an eighth aspect of the disclosure, there is provided a turbo compressor including a first pressure guide tube communicating with an intake pipe connected to a compression stage having a compressor impeller that compresses a gas; and a second pressure guide tube communicating with an intake port of the compression stage, which has a smaller internal diameter than an internal diameter of the intake pipe, in which each of the first pressure guide tube and the second pressure guide tube is to be connected to a pressure difference measurement unit that measures the flow volume of the gas on the basis of a difference in pressure between the first pressure guide tube and the second pressure guide tube.

In a ninth aspect of the disclosure based on the eight aspect, the compression stage includes an inlet part in which the intake part is formed and in which a spiral groove is formed in an outer peripheral surface of the inlet part, and a casing that has a recess into which the inlet part is fitted and forms a scroll passage in cooperation with the spiral groove, and at least a portion of the second pressure guide tube is formed in the inlet part.

In a tenth aspect of the disclosure based on the ninth aspect, at least a portion of the second pressure guide tube is formed by a first hole that is formed in a radial direction while avoiding the spiral groove in the inlet part and communicates with the intake port, and a second hole that is formed in an axial direction in the inlet part and communicates with the first hole.

In an eleventh aspect of the disclosure based on the tenth aspect, the first hole is formed outside an axial region of the inlet part where the spiral groove is formed.

In a twelfth aspect of the disclosure based on the eleventh aspect, the inlet part includes a lightening groove that is arranged around the intake port and is formed with a depth depending on an axial depth of the spiral groove, and a rib formed so as to cross the lightening groove in the radial direction, and the first hole is formed at a position corresponding to the rib.

In a thirteenth aspect of the disclosure based on any one of the tenth to twelfth aspects, a plurality of the first holes are formed at predetermined intervals in a circumferential direction in the inlet part.

In a fourteenth aspect of the disclosure based on the thirteenth aspect, a terminating portion of the spiral groove is arranged between the first holes adjacent to each other in the circumferential direction in the inlet part.

Advantageous Effects of Invention

According to the disclosure, the flow volume measurement device can be simply and inexpensively installed in the turbo compressor.

DESCRIPTION OF EMBODIMENTS

Hereinafter, embodiments of the disclosure will be described with reference to the drawings.

Figure 1:
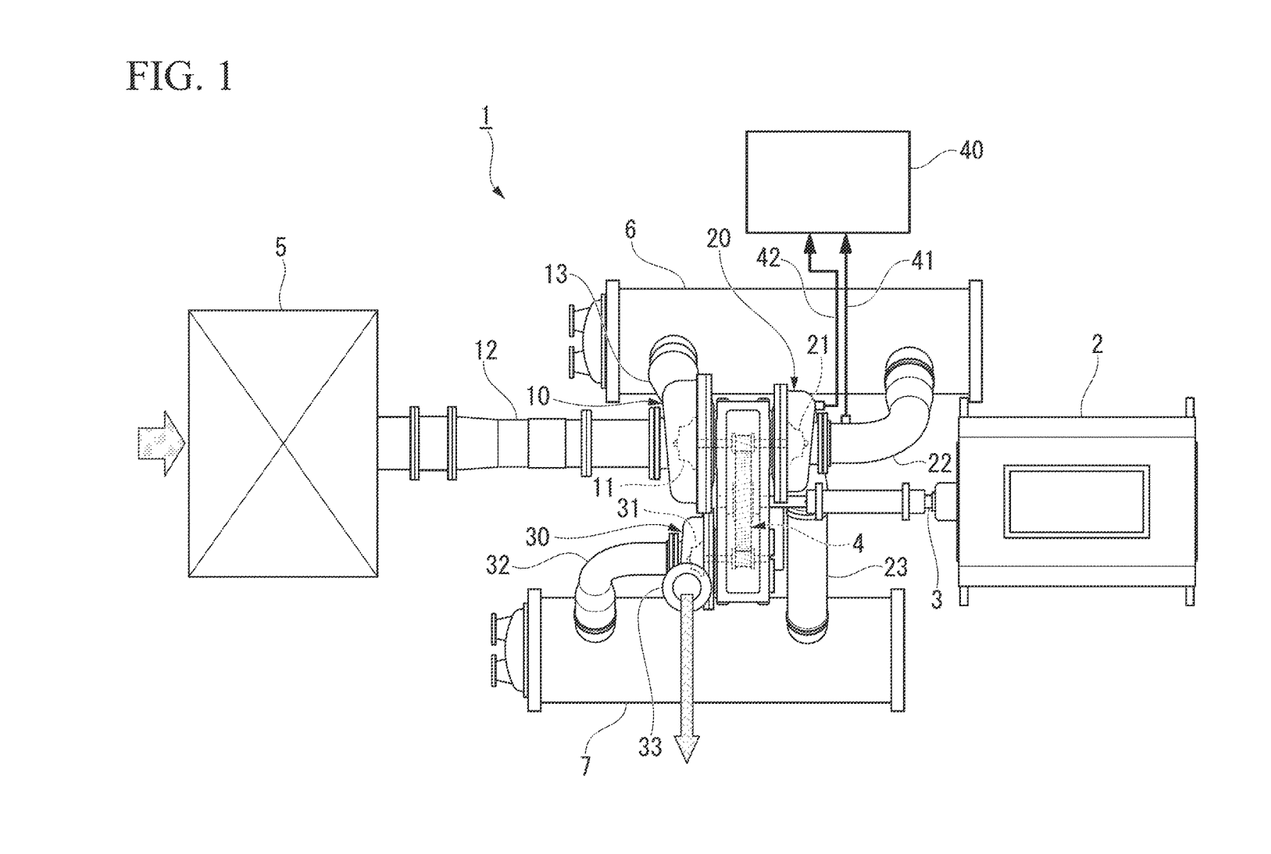
FIG. 1 is an overall configuration view of a turbo compressor in an embodiment of the disclosure.

FIG. 1 is an overall configuration view of a turbo compressor 1 in an embodiment of the disclosure.

As shown in FIG. 1, a turbo compressor 1 of the present embodiment is a multistage compressor including a first compression stage 10, a second compression stage 20, and a third compression stage 30.

The turbo compressor 1 includes an electric motor 2. The electric motor 2 rotationally drives a compressor impeller 11 of the first compression stage 10, a compressor impeller 21 of the second compression stage 20, and a compressor impeller 31 of the third compression stage 30. A driving shaft 3 of the electric motor 2 is connected to a gear device 4, and the driving power of the driving shaft 3 is transmitted to the compressor impellers 11, 21, and 31 via the gear device 4.

The compressor impellers 11, 21, and 31 are radial impellers, and have blades including three-dimensional twist (not shown) that deliver gas, which is taken in an axial direction, in a radial direction. Diffuser passages are respectively provided around the compressor impellers 11, 21, and 31, and the gas that is delivered in the radial direction is compressed in the diffuser passages and increases in pressure. Moreover, the gas can be supplied to a compressor of the following stage by scroll passages provided around the diffuser passages.

The turbo compressor 1 includes an intake filter 5. The intake filter 5 removes dirt, dust, or the like that is included in the atmospheric air. The gas that has passed through the intake filter 5 is input to the first compression stage 10 via an intake pipe 12. If compression in a first stage is performed in the first compression stage 10, this compressed gas is cooled through an intercooler 6 via a discharge pipe 13, and is input to the second compression stage 20 via an intake pipe 22.

If compression in a second stage is performed in the second compression stage 20, this compressed gas is cooled through an intercooler 7 via a discharge pipe 23, and is input to the third compression stage 30 via an intake pipe 32. The compressed gas subjected to compression in a third stage in the third compression stage 30 is supplied to an industrial machine (not shown) connected to the turbo compressor 1 via a discharge pipe 33.

The turbo compressor 1 has a flow volume measurement device 40 that measures the flow volume of gas that flows therethrough. The flow volume measurement device 40 has a first pressure guide tube 41 and a second pressure guide tube 42, and measures the flow volume of gas on the basis of a difference in pressure between the first pressure guide tube 41 and the second pressure guide tube 42. The flow volume measurement device 40 of the present embodiment, as shown in FIG. 1, measures the flow volume of gas between the first compression stage 10 and the second compression stage 20.

Next, the configuration of the flow volume measurement device 40 will be described in detail with reference to FIGS. 2 to 6.

Figure 2:
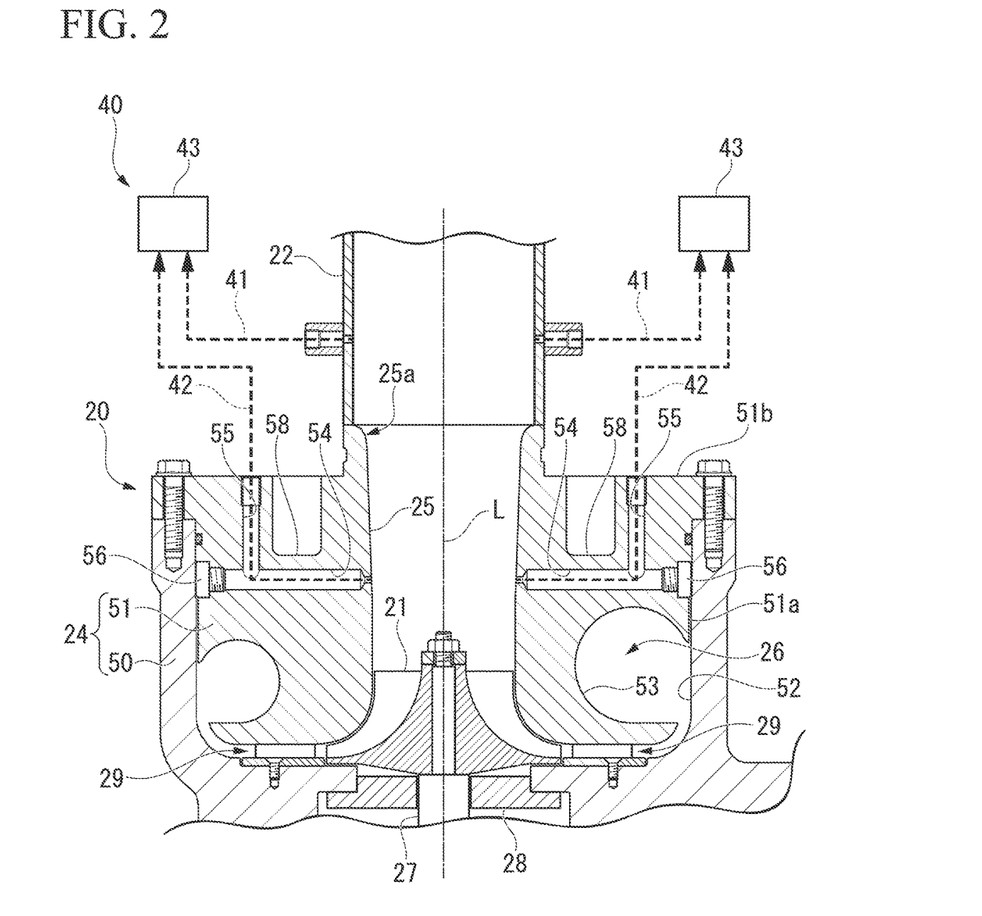
FIG. 2 is a configuration view of a flow volume measurement device in the embodiment of the disclosure.
Figure 3:
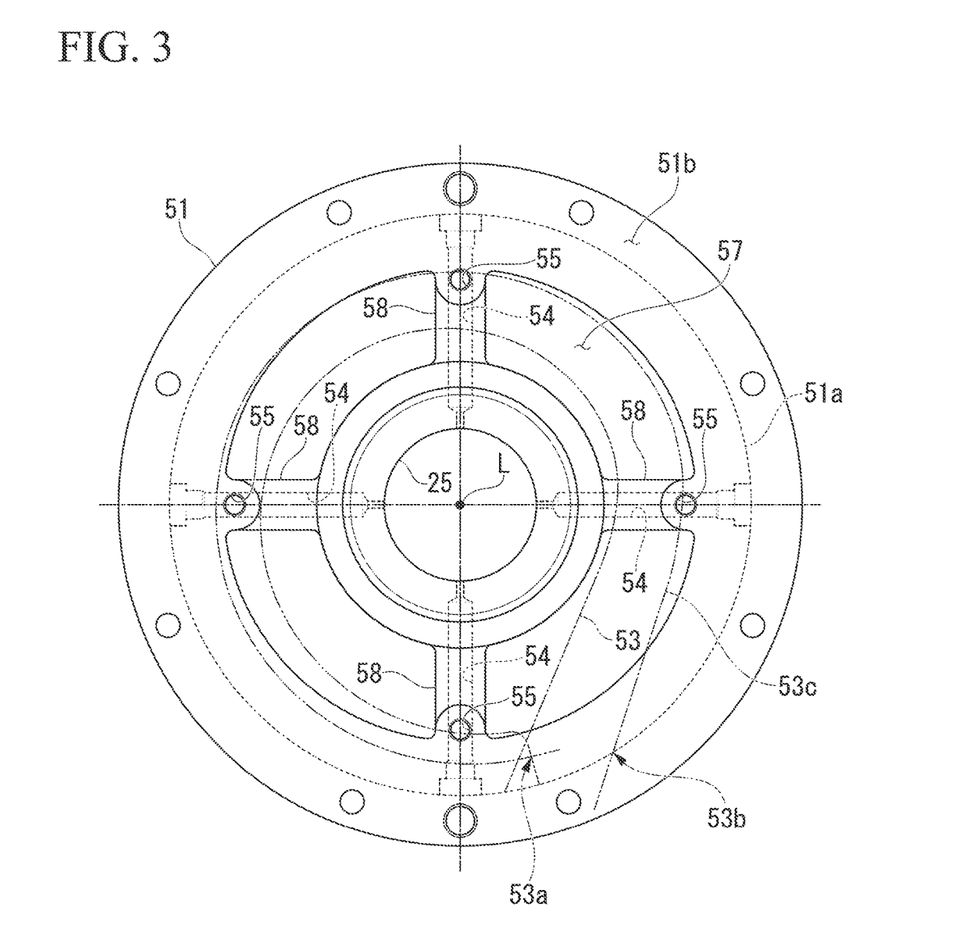
FIG. 3 is a view when an inlet part in the embodiment of the disclosure is seen from an intake port side.
Figure 4:
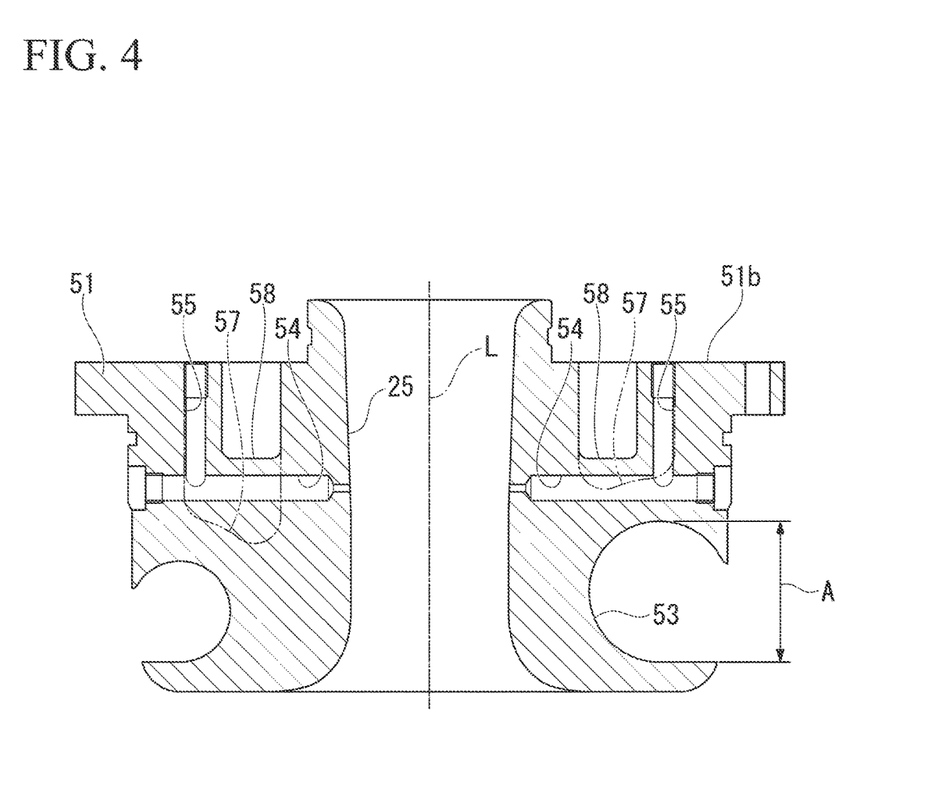
FIG. 4 is a view showing the positional relationship between first holes and a spiral groove in the embodiment of the disclosure.
Figure 5:
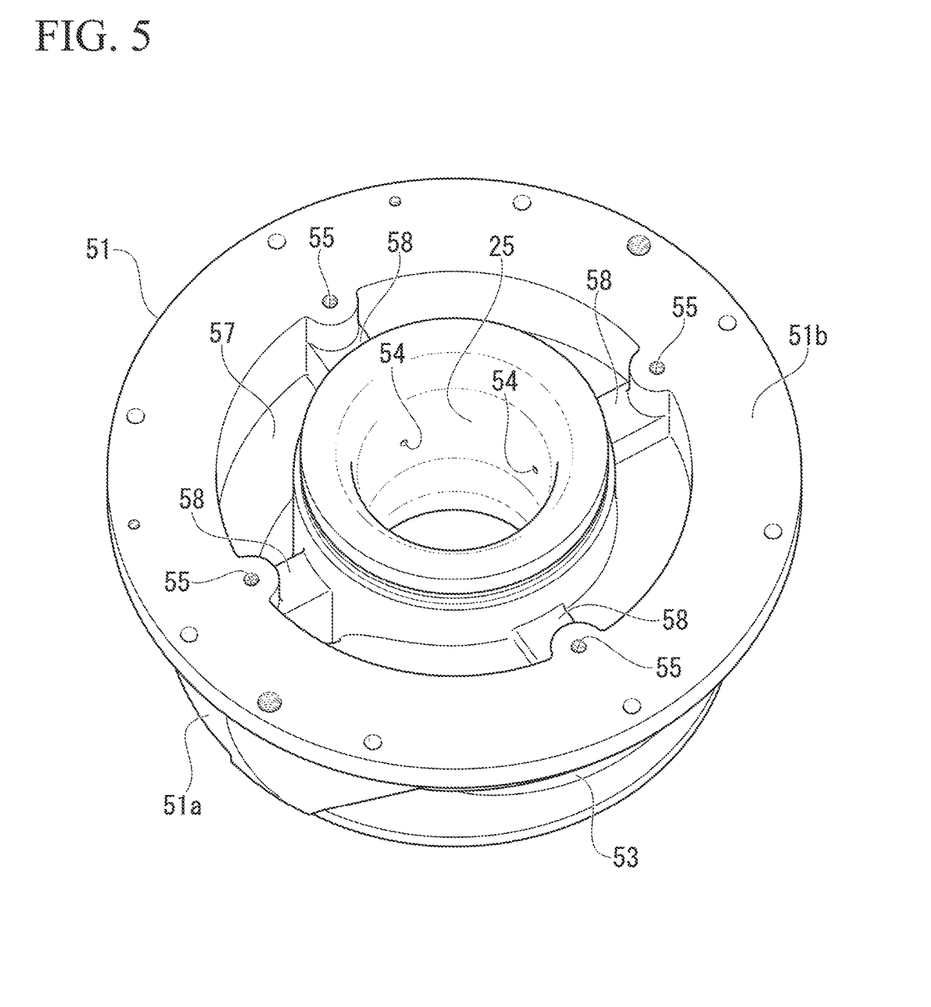
FIG. 5 is a perspective view showing a lightening groove and ribs that are formed in the inlet part in the embodiment of the disclosure.
Figure 6:
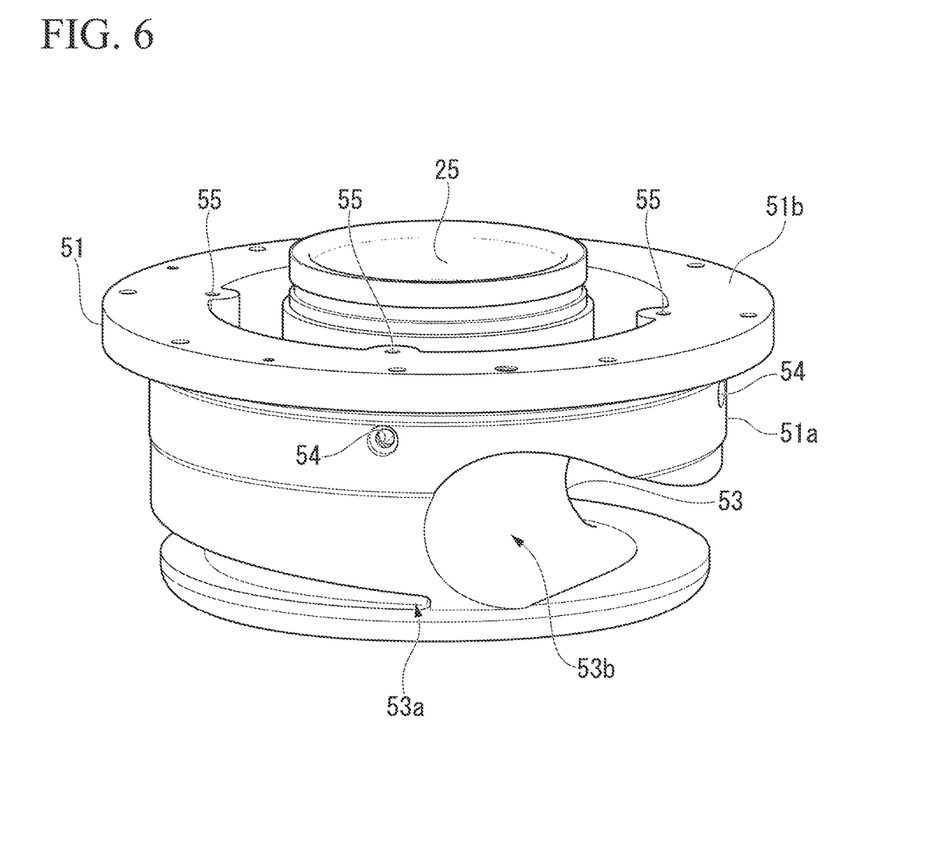
FIG. 6 is a perspective view showing the spiral groove formed in the inlet part in the embodiment of the disclosure.

FIG. 2 is a configuration view of the flow volume measurement device 40 in the embodiment of the disclosure. FIG. 3 is a view when an inlet part 51 in the embodiment of the disclosure is seen from an intake port 25 side. FIG. 4 is a view for showing the positional relationship between first holes 54 and a spiral groove 53 in the embodiment of the disclosure. FIG. 5 is a perspective view showing a lightening groove 57 and ribs 58 that are formed in the inlet part 51 in the embodiment of the disclosure. FIG. 6 is a perspective view showing the spiral groove 53 formed in the inlet part 51 in the embodiment of the disclosure.

As shown in FIG. 2, the second compression stage 20 has a compressor housing 24 that surrounds the compressor impeller 21. An intake port 25 that guides gas to the compressor impeller 21, and a scroll passage 26 into which the gas compressed by the compressor impeller 21 is introduced are formed inside the compressor housing 24. In addition, the gas introduced from the intake port 25 is air, oxygen, nitrogen, or the like, and the kind thereof is not particularly limited.

A rotating shaft 27 is integrally coupled to a back surface of the compressor impeller 21. A labyrinth seal 28 is disposed around the rotating shaft 27. The labyrinth seal 28 prevents leakage of gas from the periphery of the rotating shaft 27. A diffuser 29 that communicates with the scroll passage 26 is provided on a radial outer side of the compressor impeller 21. The diffuser 29 reduces the speed of the gas discharged in the radial direction from the compressor impeller 21, and pressurizes the gas.

The compressor housing 24 is formed by the inlet part 51 being fitted to a casing 50. The casing 50 has a recess 52 into which the inlet part 51 is fitted. The recess 52 is a bottomed cylindrical groove, and the compressor impeller 21 is disposed at the center of the recess 52. The inlet part 51 has a wall that faces a front side of the compressor impeller 21, and the inlet part 51 is fastened and fixed to the casing 50 with bolts.

The inlet part 51 is formed with the intake port 25 and the spiral groove 53. The intake pipe 22 is connected to the intake port 25. The intake port 25 has a throttle 25*a* formed at a connection thereof with the intake pipe 22, and the throttle has a smaller internal diameter than an internal diameter of the intake pipe 22. Since the intake pipe 22 has a predetermined internal diameter and is bent and piped as shown in FIG. 1, the flow velocity of gas may vary on the inner and outer sides of the bent portion. As the intake port 25 gives throttling to this gas, the flow of gas is regulated, the flow velocity of the gas is made uniform, and the gas is introduced into the compressor impeller 21.

The spiral groove 53 is formed in an outer peripheral surface 51*a* of the inlet part 51. The spiral groove 53 forms the scroll passage 26 in cooperation with an inner wall surface of the recess 52 through the fitting of the inlet part 51 to the casing 50. The spiral groove 53 is spirally formed around an axis L passing through the center of the inlet part 51. The spiral groove 53 is formed so as to become gradually larger in the axial direction in which the axis L extends, as it proceeds in a circumferential direction along the outer peripheral surface 51*a* of the inlet part 51 (refer to FIG. 6).

The flow volume measurement device 40 of the present embodiment measures the flow volume of gas from a difference in pressure between the intake pipe 22 connected to the second compression stage 20 and the intake port 25 formed in the second compression stage 20. That is, the first pressure guide tube 41 of the flow volume measurement device 40 communicates with the intake pipe 22 connected to the second compression stage 20. Additionally, the second pressure guide tube 42 of the flow volume measurement device 40 communicates with the intake port 25 of the second compression stage 20 having a smaller internal diameter than an internal diameter of the intake pipe 22.

The flow volume measurement device 40 of the present embodiment has a plurality of the first pressure guide tubes 41 and a plurality of the second pressure guide tubes 42, and has pressure difference measurement units 43 that measure respective pressure differences. The first pressure guide tubes 41 communicate with the intake pipe 22 in a plurality of places at predetermined intervals in the circumferential direction. Additionally, the second pressure guide tubes 42 communicate with the intake port 25 in a plurality of places at predetermined intervals in the circumferential direction. Accordingly, since the flow volume measurement device 40 can measure pressures in a plurality of places in the circumferential direction even in a case where the pressure of gas varies in the circumferential direction of the passages within the pipe, precise flow volume measurement can be performed on the basis of an average value of the pressures.

At least a portion of each second pressure guide tube 42 is formed in the inlet part 51 in order to communicate with the intake port 25. Specifically, at least a portion of the second pressure guide tube 42 is formed by a first hole 54 that is formed in the radial direction in the inlet part 51 and communicates with the intake port 25, and a second hole 55 that is formed in the axial direction in the inlet part 51 and communicates with the first hole 54.

The first hole 54 is formed in the radial direction toward the axis L from the outer peripheral surface 51*a* of the inlet part 51. One end of the first hole 54 is formed in a tapered shape, and opens to a peripheral surface of the intake port 25. Additionally, the other end of the first hole 54 is formed with a tap, and a plug 56 is attached to the tap and is formed so as to prevent gas from entering from the outer peripheral surface 51*a* side.

The second hole 55 is formed in the axial direction along the axis L from a flange surface 51*b* of the inlet part 51. One end of the second hole 55 communicates with the first hole 54 at a right angle thereto. Additionally, a tap is formed at the other end of the second hole 55 so that a pipe or the like can be connected thereto.

The first hole 54 is formed so as to avoid the spiral groove 53 such that compressed gas is not introduced thereinto. The positional relationship between the first hole 54 and the spiral groove 53 is shown in FIG. 4. Specifically, if an axial region (maximum region) of the inlet part 51 where the spiral groove 53 is formed is defined as a region A, the first hole 54 is designed so as to be formed outside (intake pipe 22 side) the region A in the axial direction. As a result, the first hole 54 can be disposed while reliably avoiding the spiral groove 53 over the whole circumference of the inlet part 51.

In addition, in the present embodiment, the lightening groove 57 is formed in the inlet part 51 with a depth depending on the depth of the spiral groove 53 for weight reduction, heat dissipation, or the like (refer to FIGS. 4 and 5). It is preferable that the lightening groove 57 is drilled down to the vicinity of the spiral groove 53 due to its functional property. If so, it becomes difficult to secure the thickness to form the first hole 54 in the inlet part 51. Thus, in the present embodiment, the ribs 58 are formed at important points so as to cross the lightening groove 57 (refer to FIG. 5), and the thickness of the inlet part 51 is secured (refer to FIG. 4).

The ribs 58, as shown in FIG. 3, are formed so as to extend in the radial direction. The first holes 54 are formed at positions corresponding to the ribs 58. A plurality of the first holes 54 are formed at predetermined intervals in the circumferential direction in the inlet part 51, and in the present embodiment, four first holes 54 are formed at predetermined intervals of 90 degrees. Additionally, a terminating portion 53b of the spiral groove 53 is arranged in one region between the first holes 54 adjacent to each other at an interval of 90 degrees.

The axial width of the spiral groove 53, as shown in FIG. 6, becomes larger from a starting end 53a toward the terminating portion 53b. For this reason, the terminating portion 53b of the inlet part 51 becomes thin-walled. Therefore, as shown in FIG. 3, the first holes 54 can be formed while reliably avoiding the spiral groove 53 and securing thickness by arranging the first holes 54 so as to avoid the terminating portion 53b. In addition, reference numeral 53c of FIG. 3 represents the centerline of the spiral groove 53.

Subsequently, the operation and effects of the flow volume measurement device 40 having the above configuration will be described.

The flow volume measurement device 40, as shown in FIG. 2, introduces gas from the intake pipe 22 via the first pressure guide tubes 41, introduces gas from the intake port 25 via the second pressure guide tubes 42, measures differences in pressure between both the tubes in the pressure difference measurement units 43, and measures the flow volume of the gas that flows into the second compression stage 20, on the basis of the pressure differences. Since the intake port 25 has a smaller internal diameter than an internal diameter of the intake pipe 22, a pressure difference is caused due to a difference in flow velocity between the gas that flows through the intake port 25 and the gas that flows through the intake pipe 22. Therefore, the flow volume measurement device 40 can measure the flow volume according to the same principle as that of well-known venturi tube flowmeters.

In this way, in the present embodiment, the flow volume measurement device 40 measures the flow volume of gas from the difference in pressure between the intake pipe 22 connected to the second compression stage 20 and the intake port 25 formed in the second compression stage 20. In order to make the flow of the gas introduced into the compressor impeller 21 uniform, the intake port 25 formed in the second compression stage 20 originally has a smaller internal diameter than an internal diameter of the intake pipe 22, and plays a role of a Venturi tube in flow volume measurement. For this reason, in the present embodiment, the flow volume measurement can be performed using the structure of the turbo compressor 1 without separately preparing an orifice plate or a Venturi tube, and the flow volume measurement device 40 can be simply and inexpensively installed.

Additionally, in the present embodiment, at least a portion of each second pressure guide tube 42 that communicates with the intake port 25 is formed in the inlet part 51. Accordingly, the pressure of the intake port 25 can be measured through the inlet part 51. The intake port 25 and the spiral groove 53 are formed in the inlet part 51, and it is difficult to simply provide a seat for pressure measurement as in the intake pipe 22 side. Therefore, gas is led out from the intake port 25 by forming the first holes 54 in the radial direction and forming the second holes 55 in the axial direction and by allowing both the first and second holes to communicate with each other. Therefore, the pressure of the intake port 25 can be measured while avoiding the spiral groove 53 constituting the scroll passage 26 formed in the inlet part 51. In this way, by machining the inlet part 51 and leading out gas from the intake port 25 through devising, a straight pipe welding structure is not required unlike the related art, and the installation space of the second pressure guide tubes 42 can be made smaller than the related art. Therefore, as shown in FIG. 1, when the turbo compressor 1 is a multistage compressor, the second pressure guide tubes 42 can be installed between the first compression stage 10 and the second compression stage 20 in which the intake pipe 22 is bent and disposed.

Additionally, in the present embodiment, in order to form the first holes 54 in the radial direction so as to avoid the spiral groove 53 in the inlet part 51, as shown in FIG. 4, the first holes 54 are formed outside the axial region A of the inlet part 51 where the spiral groove 53 is formed. Accordingly, the first holes 54 can be reliably disposed so as to avoid the spiral groove 53 in which the width varies gradually and greatly in the axial direction as the spiral groove proceeds in the circumferential direction of the inlet part 51.

Additionally, in the present embodiment, when the lightening groove 57 is formed in the inlet part 51 with a depth depending on the depth of the spiral groove 53 for heat dissipation or the like, the ribs 58 are provided at important points so as to cross the lightening groove 57, and the thickness of the inlet part 51 is secured. Therefore, the first holes 54 can be disposed while reliably avoiding the spiral groove 53 and securing functions, such as heat dissipation.

Additionally, by arranging the terminating portion 53b of the spiral groove 53 between the first holes 54 adjacent to each other in the circumferential direction in the inlet part 51 as shown in FIG. 3, the thickness from the first holes 54 to the spiral groove 53 does not become small as shown in FIG. 6. Therefore, the first holes 54 can be formed while reliably avoiding the spiral groove 53.

In this way, according to the above-described present embodiment, the flow volume measurement device 40 for the turbo compressor 1 is adopted. The flow volume measurement device 40 includes the first pressure guide tubes 41 communicating with the intake pipe 22 connected to the second compression stage 20 having the compressor impeller 21 that compresses a gas; and the second pressure guide tubes 42 communicating with the intake port 25 of the second compression stage 20, which has a smaller internal diameter than an internal diameter of the intake pipe 22. This flow volume measurement device 40 measures the flow volume of the gas on the basis of differences in pressure between the first pressure guide tubes 41 and the second pressure guide tubes 42. Therefore, since the flow volume of gas can be measured using the structure of the turbo compressor 1 even if an expensive orifice plate is not separately prepared, the flow volume measurement device 40 can be simply and inexpensively installed in the turbo compressor 1.

Although the preferred embodiment of the disclosure has been described above with reference to the drawings, the disclosure is not limited to the above-described embodiment. Various shapes or combinations of the respective constituent members that are shown in the above-described embodiment, are examples, and can be variously changed on the basis of design requirements or the like without departing from the scope of the disclosure.

Figure 7:
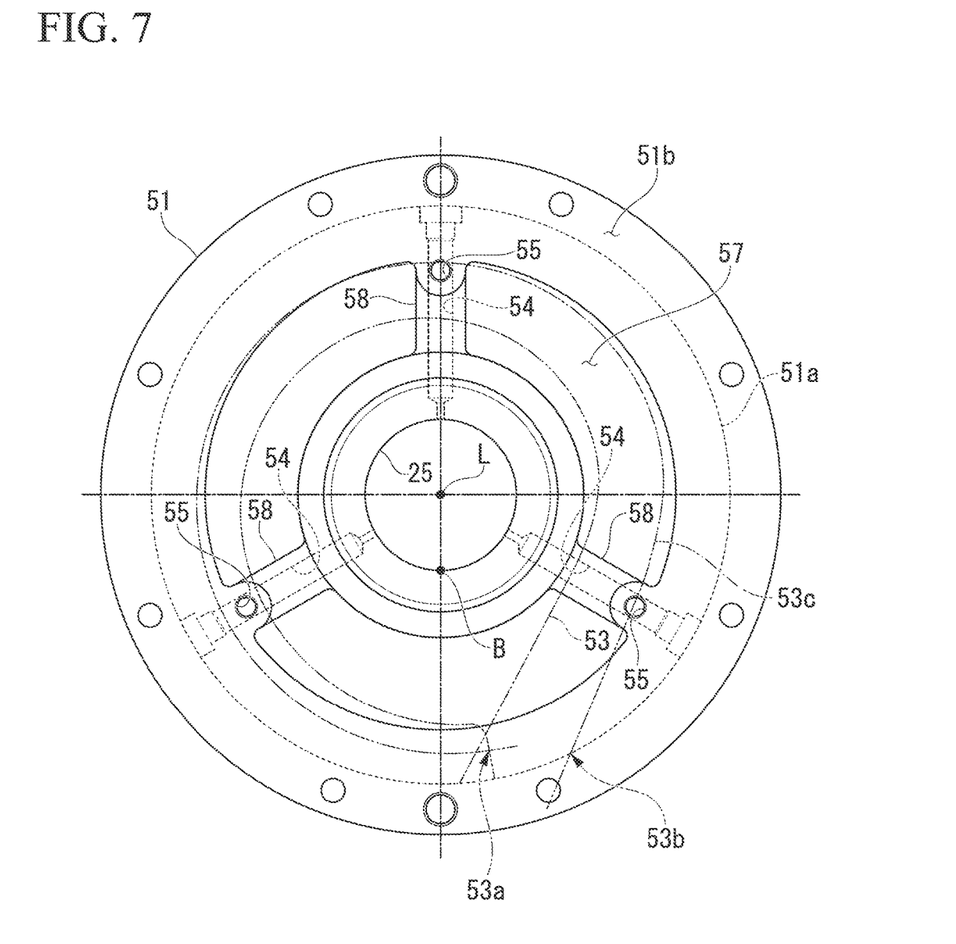
FIG. 7 is a view when an inlet part in another embodiment of the disclosure is seen from an intake port side.

For example, a configuration as shown in FIG. 7 may be adopted. In addition, in FIG. 7, reference numerals are given to the constituent parts that are the same as or equivalent to those of the above embodiment. FIG. 7 is a view, when the inlet part 51 in another embodiment is seen from the intake port side, corresponding to FIG. 3 of the above embodiment.

As shown in FIG. 7, in another embodiment, three first holes 54 are formed at predetermined intervals of 120 degrees. By forming the three first holes 54 at predetermined intervals of 120 degrees in this way, the first holes 54 can be arranged so as not to open at the lowest point B of the intake port 25. According to this configuration, condensate of gas, dust, or the like does not enter the first holes 54. Additionally, according to this configuration, the terminating portion 53b of the spiral groove 53 can be arranged with a margin between the first holes 54 adjacent to each other.

In addition, even in the above embodiment, by shifting the arrangement of the first holes 54 by 45 degrees, the first holes 54 can be arranged so as not to open at the lowest point B of the intake port 25.

Additionally, for example, although a configuration in which the plurality of first pressure guide tubes and the plurality of second pressure guide tubes are provided and the respective pressure differences are measured is described in the above embodiment, the disclosure is not limited to this configuration. For example, a configuration in which the plurality of first pressure guide tubes are altogether connected to average out pressures therebetween, the plurality of second pressure guide tubes are altogether connected to average out pressures therebetween, and a difference between the pressure of the first pressure guide tubes and the pressure of the second pressure guide tubes is measured may be adopted. Accordingly, the number of pressure difference measurement units to be installed can be reduced.

Additionally, although a configuration in which the flow volume measurement device that measures the flow volume between the first compression stage and the second compression stage has been described in the above embodiment, the disclosure is not limited to this configuration. For example, a configuration in which the flow volume is measured at an inlet of the first compression stage may be adopted, and a configuration in which the flow volume is measured (at an inlet of the third compression stage) between the second compression stage and the third compression stage may be adopted.

INDUSTRIAL APPLICABILITY

According to the disclosure, the flow volume measurement device can be simply and inexpensively installed in the turbo compressor.

What is claimed is:

1. A flow volume measurement device for a turbo compressor, comprising:
   a first pressure guide tube communicating with an intake pipe connected to a compression stage having a compressor impeller that compresses a gas; and
   a second pressure guide tube communicating with an intake port of the compression stage, which has a smaller internal diameter than an internal diameter of the intake pipe,
   wherein the flow volume measurement device measures the flow volume of the gas on the basis of a difference in pressure between the first pressure guide tube and the second pressure guide tube.

2. The flow volume measurement device for a turbo compressor according to claim 1,
   wherein the compression stage includes an inlet part in which the intake port is formed and in which a spiral groove is formed in an outer peripheral surface of the inlet part, and a casing that has a recess into which the inlet part is fitted and forms a scroll passage in cooperation with the spiral groove, and
   wherein at least a portion of the second pressure guide tube is formed in the inlet part.

3. The flow volume measurement device for a turbo compressor according to claim 2,
   wherein at least a portion of the second pressure guide tube is formed by a first hole that is formed in a radial direction while avoiding the spiral groove in the inlet part and communicates with the intake port, and a second hole that is formed in an axial direction in the inlet part and communicates with the first hole.

4. The flow volume measurement device for a turbo compressor according to claim 3,
   wherein a plurality of the first holes are formed at predetermined intervals in a circumferential direction in the inlet part.

5. The flow volume measurement device for a turbo compressor according to claim 4,
   wherein a terminating portion of the spiral groove is arranged between the first holes adjacent to each other in the circumferential direction in the inlet part.

6. The flow volume measurement device for a turbo compressor according to claim 3,
   wherein the first hole is formed outside an axial region of the inlet part where the spiral groove is formed.

7. The flow volume measurement device for a turbo compressor according to claim 6,
   wherein a plurality of the first holes are formed at predetermined intervals in a circumferential direction in the inlet part.

8. The flow volume measurement device for a turbo compressor according to claim 6,
   wherein the inlet part includes a lightening groove that is arranged around the intake port and is formed with a depth depending on an axial depth of the spiral groove, and a rib formed so as to cross the lightening groove in the radial direction, and
   wherein the first hole is formed at a position corresponding to the rib.

9. The flow volume measurement device for a turbo compressor according to claim 8,
   wherein a plurality of the first holes are formed at predetermined intervals in a circumferential direction in the inlet part.

10. The flow volume measurement device for a turbo compressor according to claim 1, wherein the first pressure guide tube communicates with the intake pipe disposed between compression stages of a multistage compressor.

11. A turbo compressor comprising:
a first pressure guide tube communicating with an intake pipe connected to a compression stage having a compressor impeller that compresses a gas; and
a second pressure guide tube communicating with an intake port of the compression stage, which has a smaller internal diameter than an internal diameter of the intake pipe,
wherein each of the first pressure guide tube and the second pressure guide tube is capable of being connected to a pressure difference measurement unit that measures the flow volume of the gas on the basis of a difference in pressure between the first pressure guide tube and the second pressure guide tube.

12. The turbo compressor according to claim 11,
wherein the compression stage includes an inlet part in which the intake port is formed and in which a spiral groove is formed in an outer peripheral surface of the inlet part, and a casing that has a recess into which the inlet part is fitted and forms a scroll passage in cooperation with the spiral groove, and
wherein at least a portion of the second pressure guide tube is formed in the inlet part.

13. The turbo compressor according to claim 12,
wherein at least a portion of the second pressure guide tube is formed by a first hole that is formed in a radial direction while avoiding the spiral groove in the inlet part and communicates with the intake port, and a second hole that is formed in an axial direction in the inlet part and communicates with the first hole.

14. The turbo compressor according to claim 13,
wherein a plurality of the first holes are formed at predetermined intervals in a circumferential direction in the inlet part.

15. The turbo compressor according to claim 14,
wherein a terminating portion of the spiral groove is arranged between the first holes adjacent to each other in the circumferential direction in the inlet part.

16. The turbo compressor according to claim 13,
wherein the first hole is formed outside an axial region of the inlet part where the spiral groove is formed.

17. The turbo compressor according to claim 16,
wherein a plurality of the first holes are formed at predetermined intervals in a circumferential direction in the inlet part.

18. The turbo compressor according to claim 16,
wherein the inlet part includes a lightening groove that is arranged around the intake port and is formed with a depth depending on an axial depth of the spiral groove, and a rib formed so as to cross the lightening groove in the radial direction, and
wherein the first hole is formed at a position corresponding to the rib.

19. The turbo compressor according to claim 18,
wherein a plurality of the first holes are formed at predetermined intervals in a circumferential direction in the inlet part.

20. The turbo compressor according to claim 11,
Wherein the first pressure guide tube communicates with the intake pipe disposed between compression stages of a multistage compressor.

* * * * *